US007958511B1

(12) United States Patent
Pomerantsev et al.

(10) Patent No.: US 7,958,511 B1
(45) Date of Patent: Jun. 7, 2011

(54) MECHANISM FOR ESTIMATING THE COMPUTING RESOURCES NEEDED TO EXECUTE A JOB

(75) Inventors: Michael Pomerantsev, San Jose, CA (US); Kaushik Patra, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1253 days.

(21) Appl. No.: 11/591,976

(22) Filed: Nov. 1, 2006

(51) Int. Cl.
*G06F 9/46* (2006.01)
(52) U.S. Cl. .................................................. 718/104
(58) Field of Classification Search .............. 718/10, 718/104
See application file for complete search history.

(56) References Cited

U.S. PATENT DOCUMENTS

| | | | | |
|---|---|---|---|---|
| 6,230,204 | B1* | 5/2001 | Fleming, III | 709/229 |
| 6,889,243 | B1* | 5/2005 | Hondou et al. | 718/100 |
| 2005/0107997 | A1* | 5/2005 | Watts et al. | 703/21 |
| 2005/0154789 | A1* | 7/2005 | Fellenstein et al. | 709/223 |
| 2005/0234935 | A1* | 10/2005 | Barsness et al. | 707/100 |
| 2006/0010449 | A1* | 1/2006 | Flower et al. | 718/102 |
| 2006/0095914 | A1* | 5/2006 | Mankovski | 718/100 |
| 2006/0195846 | A1* | 8/2006 | Benedetti | 718/102 |

OTHER PUBLICATIONS

Platform™, entitled "Platform LSF—Features, Benefits & What's New" (2 pgs), Platform Computing, Copyright © 2001-2007 Platform Computing Inc., (http://www.platform.com/Products/Platform.LSF.Family/Platform.LSF/Product. Information).

* cited by examiner

*Primary Examiner* — Meng-Ai An
*Assistant Examiner* — Louis Diep
(74) *Attorney, Agent, or Firm* — Osha • Liang LLP

(57) ABSTRACT

A mechanism is provided for estimating the computing resources needed to execute a job. The mechanism receives a request to execute a new job. The mechanism processes the request to determine a set of job characteristics for the new job, and accesses a database containing execution information for a plurality of previously executed jobs. The mechanism obtains from the database a set of execution information associated with a particular previously executed job having similar or identical job characteristics as the new job. From this execution information, the mechanism determines what computing resources were actually used to execute the particular previously executed job. Then, based upon this information, the mechanism derives an estimate of the computing resources needed to execute the new job. By estimating the needed resources in this manner, the mechanism relieves the user of having to guess at what resources will be needed to execute a job.

16 Claims, 3 Drawing Sheets

MECHANISM FOR ESTIMATING THE COMPUTING RESOURCES NEEDED TO EXECUTE A JOB

BACKGROUND

In recent years, there has been a movement in the computing industry towards the implementation of computing grids. In a computing grid, a plurality of distributed computing resources, such as processors, memories, non-volatile storages (e.g. hard drives), etc., are interconnected and shared. These resources may be dynamically provisioned and subdivided by a distributed resource manager (DRM) for purposes of executing jobs. For example, the DRM may assign one processor, one megabyte of memory, and fifty megabytes of disk space for executing a first job, and assign two processors, ten megabytes of memory, and one gigabyte of disk space for executing a second job. Because the DRM can dynamically provision the resources of the grid in almost any desired manner, the grid can be used flexibly to concurrently execute many different jobs.

One of the aspects of a grid is that, at the time a job is submitted, a set of computing resources needed to execute the job usually has to be specified. If it is not specified, then the DRM will either not accept the job, or will simply assign some default set of computing resources to the job, which may not resemble at all the resources actually needed to execute the job. Typically, the burden of determining what resources are needed to execute the job falls upon the user submitting the job. Unfortunately, the user often has no clue as to what resources will be needed; thus, the user is put in quite a dilemma.

The user can take the safe route and grossly overestimate the amount of resources needed. However, this has the potential disadvantage of delaying the execution of the job (the more resources that are required, the more likely the DRM will have to wait longer for the resources to become available; thus, the job may stay on an execution queue longer). This approach also has the disadvantage of reducing the efficiency of the grid. If resources are allocated to a job but are not used, then those resources are wasted; they could be better used for other jobs. Alternatively, the user can take the route of estimating what resources he/she believes will actually be sufficient to execute the job. Unfortunately, if the user underestimates the resources needed, then the job could be killed midstream (that is, the job may be killed by the DRM if, during execution, it exceeds its allotted resources, e.g. it tries to use more memory than it was assigned). Thus, neither option is particularly attractive to the user. Given this dilemma, an improved solution is needed.

SUMMARY

In accordance with one embodiment of the present invention, there is provided a mechanism for automatically estimating the computing resources that will be needed to execute a job. By doing so, the mechanism relieves the user of having to guess, at their peril, how much resources to request at the time of submitting a job.

In one embodiment, the mechanism operates as follows. Initially, the mechanism receives a request to execute a new job. The mechanism processes the request to determine a set of job characteristics for the new job, and then accesses a database containing execution information for a plurality of previously executed jobs. In the database, the execution information associated with a previously executed job comprises a set of job characteristics for that previously executed job, and a set of resource usage information indicating what computing resources were actually used to execute that previously executed job.

Given this information, the mechanism obtains, from the database, execution information associated with one or more particular previously executed jobs having similar or identical job characteristics as the job characteristics of the new job. From this execution information, the mechanism determines what computing resources were actually used to execute the particular previously executed job(s). Since the particular previously executed job(s) has/have job characteristics that are similar or identical to the job characteristics of the new job, it can be surmised that the new job will likely need about the same resources as the particular previously executed job (s). Thus, based at least partially upon the computing resources that were actually used to execute the particular previously executed job(s), the mechanism derives an estimate of what computing resources will be needed to execute the new job. By estimating the needed resources in this manner, the mechanism relieves the user of having to guess at what resources will be needed to execute a job at the time of submitting the job.

DETAILED DESCRIPTION OF EMBODIMENT(S)

System Overview

Figure 1:
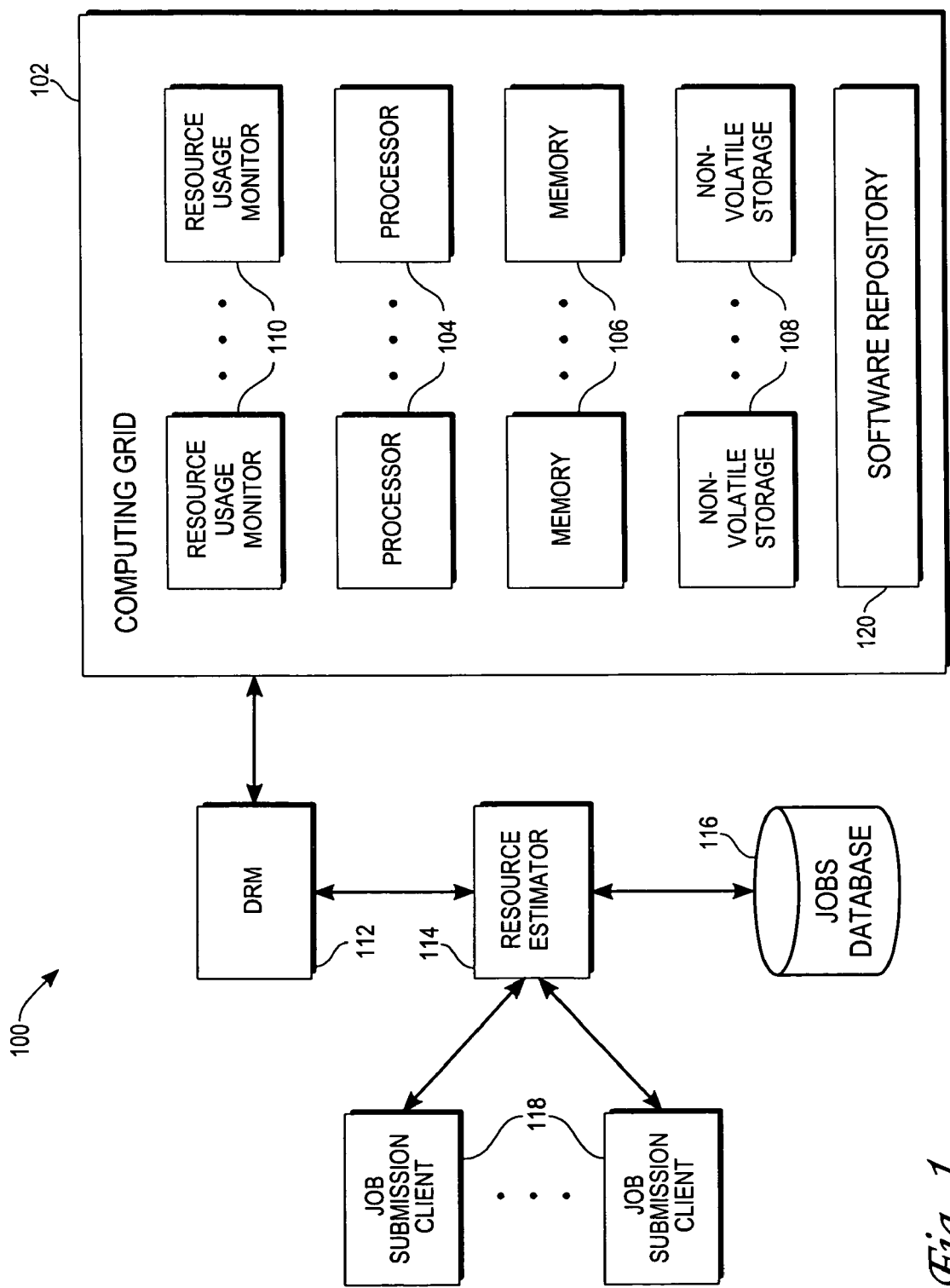
FIG. 1 is a functional block diagram of a system in which one embodiment of the present invention may be implemented.

FIG. 1 shows a functional block diagram of a system 100 in which one embodiment of the present invention may be implemented. It should be noted that the system of FIG. 1 is shown for illustrative purposes only. If so desired, the concepts taught herein may be applied to other systems having different configurations.

Computing Grid

As shown in FIG. 1, the system 100 comprises a computing grid 102. In one embodiment, the computing grid 102 comprises a plurality of processors 104, a plurality of memories 104, and a plurality of non-volatile storages 108 (e.g. magnetic disk drives, etc.). These components are interconnected, for example, by way of a network or some other interconnect (not shown), to enable them to communicate and to interact with each other. These components 104, 106, 108 may be provisioned/subdivided into subsets so that the overall grid 102 may function like a plurality of individual computer systems. For example, a subset of the processors 104, a portion of the memory 106, and a portion of the non-volatile storage 108 may be provisioned and used to execute a first job (that subset of resources acts like a first computer system), while another subset of the processors 104, another portion of the memory 106, and another portion of the non-volatile storage 108 may be provisioned and used to execute a second job (that subset of resources acts like a second computer system). After a job is executed, the resources assigned to that job are freed, thereby making them available for other jobs. When properly managed, the grid 102 can be used advantageously to flexibly execute many different jobs with many different resource requirements.

In addition to the processors 104, memories 106, and non-volatile storages 108, the grid 102, in one embodiment, also comprises one or more resource usage monitors 110. These monitors 110 may be implemented in hardware or software, and provide information pertaining to the computing resources that are actually used in the execution of jobs. For example, a monitor 110 may provide information on how many processor cycles were used to execute a job, how much memory was actually consumed (which may be different from the amount of memory that was assigned to the job), how much non-volatile storage space was actually used (which again may be different from the amount of non-volatile storage that was assigned to the job), how much time was needed to execute the job, etc. With this actual usage information, it is possible to maintain an accurate resource usage database for the jobs which, as will be elaborated upon in a later section, can be used to estimate what resources will be needed to execute future jobs.

In one embodiment, the computing grid 102 further comprises a software repository 120. This repository 120 may comprise, for example, the operating systems that will be run to support the various jobs, the applications that will be executed to satisfy the jobs, and any other software that will be needed/executed by the grid 102. The use of the software repository 120 will be discussed in a later section.

In addition to the components already described, the grid 102 may further comprise other components, such as I/O components and other peripherals. To avoid cluttering the figure, these components are not shown. Nonetheless, it should be understood that grid 102 comprises all of the components necessary for ensuring its proper operation.

Distributed Resource Manager (DRM)

The component responsible for managing the grid 102 is the distributed resource manager (DRM) 112. For purposes of the present invention, the DRM 112 may be implemented in any form using any desired technology (e.g. the functionality of the DRM 112 may be derived by having one or more processors execute one or more sets of instructions, by implementing hardwired logic, etc.). In one embodiment, the DRM 112 receives job requests, and in response, performs the necessary tasks to enable the jobs to be executed on the grid 102. Specifically, in one embodiment, the DRM 112 processes each job request to determine whether the job request specifies the resources (e.g. number of processors, amount of memory, amount of non-volatile storage space, etc.) needed to execute the job. If so, the DRM 112 will assign those resources to the job. Otherwise, the DRM 112 will assign a default set of resources to the job. In either case, the DRM 112 provisions a subset of resources for use in executing the job. In addition, the DRM 112 determines from the job request what operating system should be executed by the subset of resources to support execution of the job. After the proper operating system is determined, the DRM 112 causes the subset of resources to execute that operating system (which is stored within the software repository 120) to provide the platform needed by the job. Thereafter, the DRM 112 determines from the job request which application(s) need to be executed to satisfy the job request. In response to this determination, the DRM 112 causes the subset of resources to execute that/those application(s) (which are also stored within the software repository 120). In this manner, the DRM 112 initiates execution of the job on the grid 102. When the job is started, the DRM 112 may instruct one or more of the resource usage monitors 110 to monitor the job to keep track of the resources used by that job.

After the job is started, the DRM 112 may monitor the status of the job. When the job completes, the DRM 112 provides the status of the job (e.g. completed successfully, encountered an error, etc.), and any results generated by the job. The DRM 112 may also provide actual usage information gathered by the one or more monitors 110. In this way, the DRM 112 acts as an intermediary between the grid 102 and a job requestor.

Resource Estimator

In one embodiment, the component that submits jobs requests to the DRM 112 is the resource estimator 114. For purposes of the present invention, the resource estimator 114 may be implemented in any form using any desired technology (e.g. the functionality of the resource estimator 114 may be derived by having one or more processors execute one or more sets of instructions, by implementing hardwired logic, etc.). In FIG. 1, resource estimator 114 is shown as a separate entity from the DRM 112. However, if so desired, the functionality of the resource estimator 114 may be incorporated into the DRM 112. This and other modifications are within the scope of the present invention.

Figure 2:
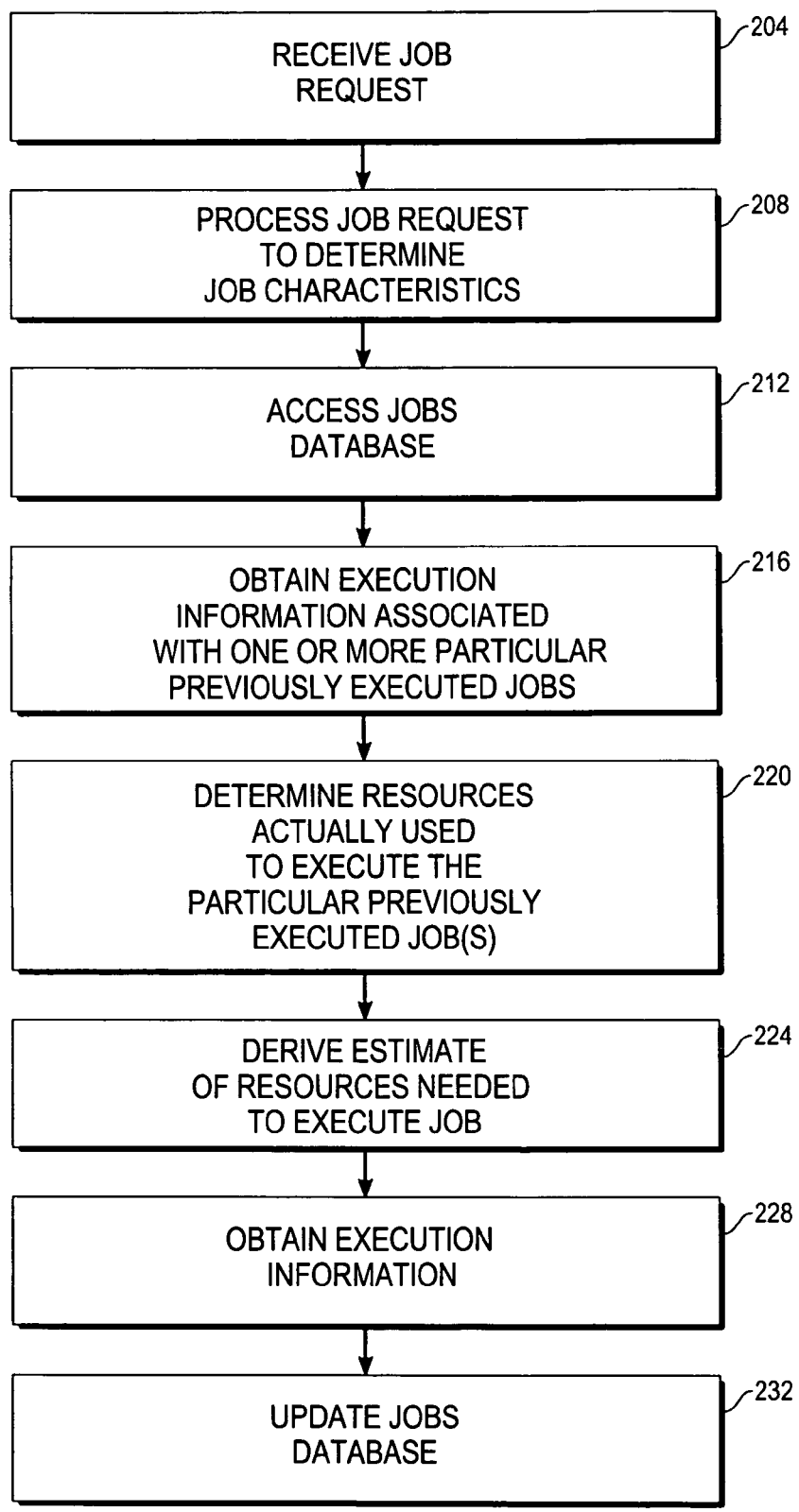
FIG. 2 is an operational flow diagram illustrating the manner in which the resource estimator of FIG. 1 operates in accordance with one embodiment of the present invention.

To describe the operation of the resource estimator 114 in accordance with one embodiment of the present invention, reference will be made to the flow diagram of FIG. 2 as well as to the system diagram of FIG. 1. In one embodiment, the resource estimator 114 receives (block 204) one or more job requests from one or more job submission clients 118. In response to a new job request, the resource estimator 114 processes (block 208) the request to determine the job characteristics for the new job (some examples of job characteristics will be provided in a later section). This may entail parsing the request and interpreting the items extracted from the parsed request. It may also entail analyzing one or more items referenced by the job request. For example, the job request may reference a file that contains one or more job characteristics and/or one or more execution parameters. In such a case, the resource estimator 114 may access the file, and process/analyze its contents. If the file references yet another file, the resource estimator 114 may repeat this process. Overall, the resource estimator 114 performs any and all necessary processing to extract from the job request all of the relevant job characteristics for the new job.

After the job characteristics are determined, the resource estimator 114 accesses (block 212) a jobs database 116. In one embodiment, the jobs database 116 contains execution information for a plurality of previously executed jobs. Each set of execution information associated with a previously executed job comprises a set of job characteristics for that previously executed job, and a set of resource usage information indicating what computing resources were actually used to execute that previously executed job. For example, the resource usage information may indicate a certain number of processors, a certain amount of memory, a certain amount of non-volatile storage space, etc. that were actually used to execute the previously executed job. For purposes of the present invention, the job database 116 may be any type of database, including but not limited to a relational database, a flat file database, a hierarchical database, an object oriented database, a set of hierarchically arranged data structures (e.g. file system directories and files), a table, etc.

Using the job characteristics of the new job as search criteria, the resource estimator 116 searches the jobs database 116 or causes the jobs database 116 to be searched (e.g. in the case of a relational database, the resource estimator 116 would submit one or more queries to a relational database management system to cause the relational database management system to perform one or more searches) to find one or more previously executed jobs having similar or identical job characteristics as the new job. In one embodiment, this search may uncover a previously executed job having identical job characteristics, or it may uncover one or more previously executed jobs having similar but not identical job characteristics. In the case where no previously executed job having identical job characteristics is found, the resource estimator 114 will select one or more previously executed jobs having job characteristics that are closest to the job characteristics of the new job, where the closeness determination is made based upon some predetermined selection criteria. These job(s) will be referred to hereinafter as "closely matching" job(s). After the identical or closely matching job(s) is/are found, the resource estimator 114 obtains (block 216) from the jobs database 116 the execution information pertaining to that/those job(s).

From the execution information, and more specifically, from the resource usage information in the execution information, the resource estimator 114 determines (block 220) what computing resources were actually used in executing the previously executed job(s). Based at least partially upon the computing resources actually used in executing the previously executed job(s), the resource estimator 114 derives (block 224) an estimate of what computing resources will be needed to execute the new job. In one embodiment, the estimate is derived as follows.

In the case where the resource estimator 114 finds a previously executed job having identical job characteristics as the new job, the resource estimator 114 uses the resource usage information for that previously executed job as the estimate. Thus, if the previously executed job used X processors, Y amount of memory, and Z amount of non-volatile storage space, then the resource estimator 114 will use those figures as the estimate for the new job. In the case where the resource estimator 114 does not find a previously executed job having identical job characteristics as the new job, then the resource estimator 114 will either use the resource usage information from a closely matching job as the estimate, or it will generate an estimate based upon the resource usage information from one or more closely matching jobs. In the case where the resource estimator 114 generates an estimate, the estimate will be different from the resource usage information of any of the closely matching jobs.

As an example of when an estimate might be generated, suppose that one of the job characteristics of a job is the size of a data file on which the job will operate. Suppose further that all of the job characteristics of a closely matching job are the same as the job characteristics of the new job except for the file size. In such a case, the resource estimator 114 may adjust one or more of the estimated resources such that they are commensurate with the difference in file size. For example, if the file size of the closely matching job is 1 MB and the memory used by the closely matching job was 5 MB, and if the file size of the new job is 1.2 MB, then the resource estimator 114 may estimate the memory needed by the new job to be 6 MB. This and other adjustments may be made to derive the resource estimate. Thus, the estimated resources may be different from the actual resources used by any of the closely matching jobs.

The above example shows the use of a single closely matching job in generating an estimate. It should be noted that multiple closely matching jobs may also be used in generating an estimate. For example, continuing with the above example, suppose that another closely matching job (having all other job characteristics the same as the new job except for the file size) has a file size of 1.4 MB and an actual memory used amount of 5.4 MB. Suppose again that the file size of the new job is 1.2 MB. In such a case, since the file size of the new job (1.2 MB) is at the midpoint between the file sizes of the two closely matching jobs (1 MB and 1.4 MB), then the resource estimator 114 may estimate the memory needed by the new job to also be at the midpoint (5.2 MB) between the actual memory used by the two closely matching jobs (5 MB and 5.4 MB). These examples show only a few ways in which the resource estimator 114 may use the actual resource usage information of the closely matching jobs to generate the resource estimate for the new job. Many other methods for generating the resource estimate are possible. All such methods are within the scope of the present invention.

In one embodiment, after the resource estimator 114 derives a resource estimate (e.g. number of processors, amount of memory, amount of non-volatile storage space, etc.) for the new job, the resource estimator 114 updates the job request to include the resource estimate. The resource estimator 114 then submits the updated job request to the DRM 112. In some implementations, the original job request received from the job submission client 118 will have already specified some suggested computing resources to be assigned to the new job. In such a case, the resource estimate derived by the resource estimator 114 may (or may not) supersede the suggested computing resources specified in the original job request (in some implementations, the resource estimate may take precedence over the suggested computing resources, whereas in other implementations, the suggested computing resources may take precedence over the resource estimate). If the resource estimate does supersede the suggested computing resources, then the resource estimator 114 will update the job request with the derived resource estimate. Otherwise, the resource estimator 114 will leave the job request as is. In either case, the job request is submitted to the DRM 112. In response to the job request, the DRM 112 operates in the manner described above to cause the job to be executed on the grid 102.

At some point, execution of the new job is completed. When that occurs, the resource estimator 114 obtains (block 228) from the DRM 112 execution information pertaining to the new job. In one embodiment, this execution information includes the execution status (e.g. success, failure, error, etc.), the execution results (if any), and resource usage information indicating what computing resources (e.g. number of processors, amount of memory, amount of non-volatile storage space, etc.) were actually used in executing the new job. This resource usage information may be different from the resource estimate derived by the resource estimator 114. Given this information, the resource estimator 114 forwards the execution status and results (if any) to the appropriate job submission client 118, and updates (block 232) the jobs database 116 (if update is needed). In one embodiment, updating of the jobs database 116 is performed as follows.

Initially, the resource estimator 114 checks the execution status of the new job. If the new job completed successfully, then the resource estimator 114 will use the actual resource usage information obtained from the DRM 112 for the new job to update the jobs database 116. However, if the new job failed, the resource estimator 114 will determine the reason for the failure. If the new job failed because of insufficient resources, then the resource estimator 114, in one embodiment, will double the resource estimate and use that amount to update the jobs database 116 (in one embodiment, only the amount of memory and the amount of non-volatile storage space is doubled; the number of processors stays the same). Thus, if the estimate for the new job was 1 MB of memory and 50 MB of non-volatile storage space, the resource estimator 114 will double the memory to 2 MB and double the non-volatile storage space to 100 MB. Alternatively, if the new job failed due to other reasons, then the resource estimator 114 will use the larger of (1) the resource estimate for the new job and (2) the actual resource usage information obtained from the DRM 112 to update the jobs database 116. Thus, if the estimate was for 2 MB of memory and 50 MB of non-volatile storage space, and the actual usage was 1 MB of memory and 30 MB of non-volatile storage space, the resource estimator 114 will use the 2 MB of memory and the 50 MB of non-volatile storage space to update the jobs database 116. The reason for this is that the job may have failed before it reached its peak resource usage; thus, the actual resource usage information is likely to be inaccurate. This methodology may be used to determine the values that will be used to update the jobs database 116.

To actually update the jobs database 116, the resource estimator 114 determines whether a job already exists in the jobs database 116 having job characteristics that are identical to the job characteristics of the new job. If so, the resource estimator 114 does not create a new set of execution information. Rather, it just updates the execution information for that already existing job to reflect the resource usage information for the new job. On the other hand, if the resource estimator 114 determines that there is no currently existing job in the jobs database 114 having identical job characteristics as the new job, then the resource estimator 114 will create a new set of execution information in the jobs database 116, store the job characteristics of the new job into the new set of execution information, and store the resource usage information determined above into the new set of execution information. Once that is done, the jobs database 114 is properly updated. In the manner described, the resource estimator 114 maintains the jobs database 116, and uses it to estimate the computing resources needed to execute jobs.

Implementation Scenarios

It has been observed that the resource estimation mechanism/methodology described above is most effective in implementation scenarios in which a relatively small set of applications, tools, sets of software, etc. (referred to hereinafter as applications) are executed repeatedly, and those applications operate repeatedly on the same set or similar sets of data. In actual practice, there are many implementation scenarios in which this is true. Two such scenarios will be discussed below (note: these scenarios are provided for illustrative purposes only; the present invention is not limited to application in such scenarios, but rather, may be applied in all possible scenarios).

A computer aided design (CAD) environment is one in which the present invention is particularly useful. In a CAD environment, a relatively small set of applications are used for simulation, testing, routing, etc. These applications often operate repeatedly on the same set or slightly amended sets of data. For example, during the design and development of an electronic "cell" (which may be a relatively small core component or a larger scale component), a user may test the cell many times. Each time the cell is tested, the same application is executed, and the data set (i.e. the data file in which the cell is defined) is largely the same (the cell design usually does not change significantly from test to test). Thus, each successive execution of the testing job is quite similar to the previous execution(s) of the testing job. This repetition and similarity makes the resources needed to execute a new job quite predictable.

In the CAD context, there are certain job characteristics that are key in determining how much computing resources will be needed to execute a job. These job characteristics are also key in finding previously executed jobs that are closest in resource requirement to a new job. In one embodiment, in the CAD context, the key job characteristics include an identifier for the application that is to be executed (e.g. this could be the name of the CAD application that is to be run), and an identifier for the data set on which the application is to operate (e.g. this could be the name of the cell on which the CAD application is to operate). Often, CAD applications can be executed in different modes (e.g. drc or lvs). Thus, the execution mode of the application, and other execution parameters of the application, may also be part of the job characteristics. The size of the data set may also be one of the job characteristics. As described above, the size of the data set may be used to generate adjusted estimates for one or more computing resources. Furthermore, the ID of the user submitting a CAD job may be used as one of the job characteristics. In a CAD environment, different users may give different cells the same name. To find the closest matching previously executed jobs, the ID of the user submitting the new job and the previously executed jobs is often quite helpful. These and other job characteristics may be taken into account in finding closely matching previously executed CAD jobs. The better the match that is found, the more accurate the resource estimate will be.

Another context in which the present invention is particularly useful is that of software builds. In the software build context, the same set of applications are executed over and over again to compile source code into object code and to link the object code to produce an overall executable program. The applications also often operate on the same sets or very similar sets of data files (e.g. source code files). For example, during the development of a program, slightly different versions of the source code files are compiled and linked multiple times to build different versions of the executable program. Each build uses the same application(s), and the application (s) operate on very similar data sets (source code often does not change very much from version to version). Thus, each successive build job is quite similar to the previous build job. This repetition and similarity makes the resources needed to execute a new build job quite predictable.

In the build context, there are certain job characteristics that are key in determining how much computing resources will be needed to execute a job. These job characteristics are also key in finding previously executed jobs that are closest in resource requirement to a new job. In one embodiment, in the build context, the key job characteristics include an identifier for the application that is to be executed (e.g. this could be the name of the build tool that is to be run), and an identifier for the data set(s) on which the application is to operate (e.g. this could be the name(s) of the source file(s)). The job characteristics may further include the type of the job (e.g. whether or not to use nightly shared build, whether or not to build dependent tools along with the current component, etc.), how many parallel processes are desired, the type of the build target (e.g. optimized 32 bit, or debug 64 bit; also includes many other targets apart from pure build targets (e.g. unit test, regress, doxygen document generation, etc.)), and the size of the data sets. These and other job characteristics may be taken into account in finding closely matching previously executed build jobs. The better the match that is found, the more accurate the resource estimate will be.

In some if not most contexts, the job characteristics can be put into one of two categories: (1) scalable; and (2) non-scalable. In the CAD example provided above, the scalable job characteristic would be the size of the data set, and the non-scalable job characteristics would be the application identifier, the data set identifier (e.g. cell name), the execution parameters of the application, and the ID of the user. The scalable characteristics are the ones that can be scaled or interpolated. The non-scalable characteristics are that ones that need to be exactly matched. In one embodiment, in order to find that a previously executed job is a "close match" to a new job, at least some of the non-scalable characteristics would have to be exactly matched, and the scalable characteristics would have to be close.

For purposes of finding close matches, the resource estimator 114 may assign different weights or priorities to different job characteristics. These priorities may be customized, and may be application specific. These priorities may be used by the resource estimator 114 to choose among multiple partially matching jobs.

For example, suppose that a new CAD job has the following job characteristics:
 application=A; mode=drc; cell name=rk_core; size=3 MB; and user=Michael.
Suppose further that the jobs database 116 has the following sets of execution information for two previously executed jobs:
 application=A; mode=drc; cell name=rk_clock; size=3 MB; user=Michael; 2 processors; 5 MB of memory; 20 MB of non-volatile storage space
 application=A; mode=drc; cell name=rk_core; size=3 MB; user=Kaushik; 3 processors; 10 MB of memory; 100 MB of non-volatile storage space.
As can be seen, neither of the previously executed jobs has job characteristics that are identical to the job characteristics of the new job. To choose between the two previously executed jobs, the resource estimator 114 may apply different priorities to different job characteristics. For example, the resource estimator 114 may give the "cell name" job characteristic a higher priority than the "user" job characteristic. In such a case, the second previously executed job would be determined to be the closer match since it has the same cell name as the new job, and the resources of 3 processors, 10 MB of memory, and 100 MB of non-volatile storage space would be used as the resource estimate.

In one embodiment, the different priorities assigned to the various job characteristics may be specified by a user via configuration metadata, or they may be hardcoded into the resource estimator 114. Additionally, data mining may be used to automatically develop the best strategies for determining job matching and resource estimates. This and other enhancements are within the scope of the present invention.

Hardware Overview

In one embodiment, the DRM 112 and the resource estimator 114 may take the form of sets of instructions that are executed by one or more processors. In such a form, they may be executed by the computing grid 102 or by a separate computer system, such as the system shown in FIG. 3. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312 for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may further be a network connection that connects one or more of the components. Any mechanism and/or medium that enables information, signals, data, etc., to be exchanged between the various components may be used as bus 302.

Figure 3:
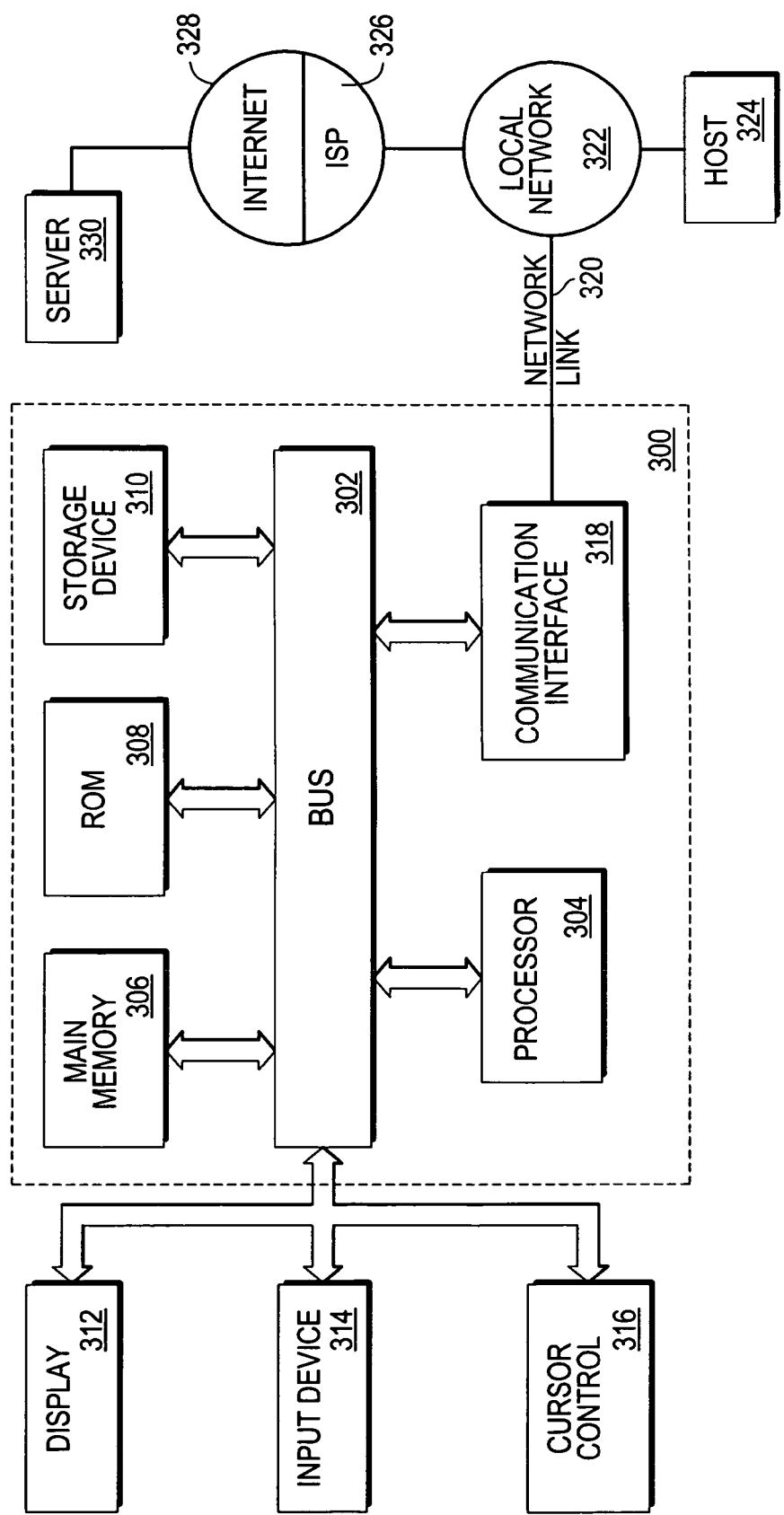
FIG. 3 is a block diagram of a general purpose computer system in which one embodiment of the present invention may be implemented.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:
    receiving a request to execute a new job;
    processing the request to determine a set of job characteristics for the new job;
    accessing a database containing execution information for a plurality of previously executed jobs, wherein the execution information associated with a previously executed job comprises a set of job characteristics for that previously executed job, and a set of resource usage information indicating what computing resources were actually used to execute that previously executed job;
    obtaining, from the database, the execution information associated with a particular previously executed job having similar or identical job characteristics as the job characteristics of the new job;
    determining, based at least partially upon the execution information associated with the particular previously executed job, what computing resources were actually used to execute the particular previously executed job; and
    deriving, based at least partially upon the computing resources that were actually used to execute the particular previously executed job, an estimate of what computing resources will be needed to execute the new job,
    wherein the job characteristics are categorized into scalable and non-scalable characteristics, and
    wherein the job characteristics of the new job include an indication of a particular application to be executed, one or more execution parameters for the particular application, and an indication of one or more particular sets of data on which the particular application is to operate.

2. The method of claim 1, wherein the job characteristics of the new job further include an indication of a size of the particular set of data.

3. The method of claim 1, wherein the job characteristics of the new job include an indication of a type of job, an indication of a type of target, and an indication of a number of parallel processes that are to be executed to execute the new job.

4. The method of claim 1, wherein the job characteristics of the new job are not identical to the job characteristics of the particular previously executed job, and wherein deriving an estimate of what computing resources will be needed to execute the new job comprises:
    deriving a set of estimated computing resources for executing the new job, wherein the set of estimated computing resources is different from the computing resources that were actually used to execute the particular previously executed job.

5. The method of claim 1, wherein the estimate of what computing resources will be needed to execute the new job includes a number of processors, an amount of memory, and an amount of non-volatile storage space.

6. The method of claim 5, wherein the method further comprises:
    causing the new job to be executed in a distributed computing grid in accordance with the estimate of computing resources, such that in the distributed computing grid, the new job is assigned the number of processors, the amount of memory, and the amount of non-volatile storage space set forth in the estimate of computing resources.

7. The method of claim 1, further comprising:
    obtaining actual usage information for the new job, wherein the actual usage information indicates what computing resources were actually used in executing the new job; and
    updating the database to reflect the actual usage information for the new job.

8. The method of claim 1, wherein the request specifies suggested computing resources to be assigned for the new job, and wherein the method further comprises:
    superseding the suggested computing resources specified in the request with the estimate of computing resources.

9. A non-transitory machine readable medium, comprising:
    instructions for causing one or more processors to receive a request to execute a new job;
    instructions for causing one or more processors to process the request to determine a set of job characteristics for the new job;
    instructions for causing one or more processors to access a database containing execution information for a plurality of previously executed jobs, wherein the execution information associated with a previously executed job comprises a set of job characteristics for that previously executed job, and a set of resource usage information indicating what computing resources were actually used to execute that previously executed job;
    instructions for causing one or more processors to obtain, from the database, the execution information associated with a particular previously executed job having similar or identical job characteristics as the job characteristics of the new job;
    instructions for causing one or more processors to determine, based at least partially upon the execution information associated with the particular previously executed job, what computing resources were actually used to execute the particular previously executed job; and
    instructions for causing one or more processors to derive, based at least partially upon the computing resources that were actually used to execute the particular previously executed job, an estimate of what computing resources will be needed to execute the new job,
    wherein the job characteristics are categorized into scalable and non-scalable characteristics, and
    wherein the job characteristics of the new job include an indication of a particular application to be executed, one or more execution parameters for the particular application, and an indication of a particular set of data on which the particular application is to operate.

10. The non-transitory machine readable medium of claim 9, wherein the job characteristics of the new job further include an indication of a size of the particular set of data.

11. The non-transitory machine readable medium of claim 9, wherein the job characteristics of the new job include an indication of a type of job, an indication of a type of target, and an indication of a number of parallel processes that are to be executed to execute the new job.

12. The non-transitory machine readable medium of claim 9, wherein the job characteristics of the new job are not identical to the job characteristics of the particular previously executed job, and wherein the instructions for causing one or more processors to derive an estimate of what computing resources will be needed to execute the new job comprises:
    instructions for causing one or more processors to derive a set of estimated computing resources for executing the new job, wherein the set of estimated computing resources is different from the computing resources that were actually used to execute the particular previously executed job.

13. The non-transitory machine readable medium of claim 9, wherein the estimate of what computing resources will be needed to execute the new job includes a number of processors, an amount of memory, and an amount of non-volatile storage space.

14. The non-transitory machine readable medium of claim 13, further comprising:
    instructions for causing one or more processors to cause the new job to be executed in a distributed computing grid in accordance with the estimate of computing resources, such that in the distributed computing grid, the new job is assigned the number of processors, the amount of memory, and the amount of non-volatile storage space set forth in the estimate of computing resources.

15. The non-transitory machine readable medium of claim 9, further comprising:
    obtaining actual usage information for the new job, wherein the actual usage information indicates what computing resources were actually used in executing the new job; and
    updating the database to reflect the actual usage information for the new job.

16. The non-transitory machine readable medium of claim 9, wherein the request specifies suggested computing resources to be assigned for the new job, and wherein the machine readable medium further comprises:
    instructions for causing one or more processors to supersede the suggested computing resources specified in the request with the estimate of computing resources.

* * * * *